United States Patent
Stecher et al.

(10) Patent No.: US 10,785,346 B1
(45) Date of Patent: Sep. 22, 2020

(54) UNBLOCKING PROCESSES IN INTERPROCESS MESSAGING PASSING

(71) Applicant: 2236008 Ontario Inc., Waterloo (CA)

(72) Inventors: Brian John Stecher, Kanata (CA); Kaushik Thirukonda, Kanata (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 16/377,879

(22) Filed: Apr. 8, 2019

(51) Int. Cl.
*H04L 29/06* (2006.01)
*G06F 9/4401* (2018.01)
*H04L 29/08* (2006.01)

(52) U.S. Cl.
CPC ............ *H04L 67/42* (2013.01); *G06F 9/4416* (2013.01); *H04L 67/10* (2013.01); *H04L 67/32* (2013.01)

(58) Field of Classification Search
CPC ........ G06F 9/4416; G06F 9/542; G06F 9/546; G06F 13/14; G06F 11/1687; H04L 67/32; H04L 67/42
See application file for complete search history.

(56) References Cited

U.S. PATENT DOCUMENTS

| | | | | | |
|---|---|---|---|---|---|
| 5,963,947 | A | * | 10/1999 | Ford | G06F 9/449 |
| 5,974,420 | A | * | 10/1999 | Lehman | G06F 9/544 |
| 6,606,742 | B1 | * | 8/2003 | Orton | G06F 8/70 |
| | | | | | 717/140 |
| 7,840,682 | B2 | * | 11/2010 | Boyd | H04L 67/14 |
| | | | | | 370/254 |
| 8,205,218 | B1 | * | 6/2012 | McCann | G06F 9/4411 |
| | | | | | 707/705 |
| 8,667,184 | B2 | * | 3/2014 | Boyd | H04L 47/10 |
| | | | | | 709/238 |
| 2004/0243944 | A1 | * | 12/2004 | Sabiers | G06F 9/451 |
| | | | | | 715/853 |
| 2006/0200828 | A1 | * | 9/2006 | Na | H04L 41/22 |
| | | | | | 719/313 |
| 2006/0277284 | A1 | * | 12/2006 | Boyd | H04L 47/10 |
| | | | | | 709/223 |
| 2009/0183154 | A1 | * | 7/2009 | Miskelly | G06F 9/485 |
| | | | | | 718/100 |

(Continued)

FOREIGN PATENT DOCUMENTS

EP 1729481 A2 12/2006

OTHER PUBLICATIONS

QNX Software Systems Limited: "QNX® Neutrino® RTOS, C Library Reference", electronic edition published on Aug. 17, 2017.

(Continued)

*Primary Examiner* — Jerry B Dennison
(74) *Attorney, Agent, or Firm* — Rowand LLP (57) ABSTRACT

A thread of a client process may become blocked awaiting a reply to a message sent to a server process. Unblocking the client may include determining by the operating system that a timeout has expired without the server having replied to the message and then sending a request to the server process reply to the message to unblock the client. After sending the request for the server to reply to the message, the operating system may determine that the server has still not replied to the message after a further period has elapsed. If so, one or more actions related to the server process may be triggered. For example, a signal may be sent to the server process or the computer system may be rebooted.

26 Claims, 5 Drawing Sheets

(56) References Cited

U.S. PATENT DOCUMENTS

| | | | |
|---|---|---|---|
| 2009/0319996 A1* | 12/2009 | Shafi | G06F 8/314 717/125 |
| 2009/0320021 A1* | 12/2009 | Pan | G06F 11/3476 718/100 |
| 2011/0061062 A1* | 3/2011 | Chu | G06F 9/546 719/314 |
| 2014/0310438 A1* | 10/2014 | Richardson | G06F 9/526 710/200 |
| 2018/0285328 A1* | 10/2018 | Pivato | G06F 8/38 |
| 2019/0372959 A1* | 12/2019 | Pattar | H04L 63/0815 |

OTHER PUBLICATIONS

QNX Software Systems Limited: "Getting Started with QNX® Neutrino®: A Guide for Realtime Programmers", electronic edition published on Jul. 28, 2017.

Xiaocong Fan et al.: "Intertask Communication: Signaling 577 21.6 Spinlocks and Interrupt Events from ISRs" Sep. 14, 2015.

Extended European Search Report Relating to Application No. 20159925.5 dated Aug. 4, 2020.

\* cited by examiner

UNBLOCKING PROCESSES IN INTERPROCESS MESSAGING PASSING

TECHNICAL FIELD

The present disclosure relates to interprocess communication (IPC), and, more particularly, to the message passing interprocess communication.

BACKGROUND

Modern computer operating systems support multiple concurrent processes. These processes may communicate with each other. For example, in the case of microkernel operating systems, some processes may communicate with other processes responsible for providing operating system services that would be provided by the operating system kernel in an operating system with a monolithic kernel. Communications between processes may follow a message passing model. In message passing, facility may be provided for one process to send a message to another process. For example, it may be that a client process sends a message to a server process. The other process may then handle the message and provide a reply to the message.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

According to the subject-matter of the present application, there may be provided a computer-implemented method. The method may include sending a message by a sending thread of a client process to a server process. It may be that the sending thread of the client process is blocked by the sending to await a reply to the message from the server process. The method may further include determining by an operating system managing the client process and the server process that a timeout has expired without the server process having replied to the message. The method may further include, upon determining that the timeout has expired without the server process having replied to the message, sending a request to the server process to unblock the sending thread of the client process by replying to the message. The method may further include, after sending the request for the server process to unblock the sending thread by replying to the message, determining, by the operating system, that a further period has elapsed without the server process having replied to the message. The method may further include, upon determining that the further period has elapsed without the server process having unblocked the sending thread by replying to the message, triggering one or more actions related to the server process.

Conveniently, in this way, actions may be taken such as may unblock the reply-blocked client process and/or may otherwise restore the system to a known state. For example, the non-responsive server may be sent a signal to cause it to terminate. In another example, the computer system as a whole could be rebooted.

In some implementations, the one or more actions may include sending a signal to the server process. For example, the signal may comprise a signal to the server process to terminate.

In some implementations, the one or more actions may include restarting the operating system.

In some implementations, the one or more actions may be performed in sequence. For example, the one or more actions may be performed in sequence with a configurable delay between the performing of a given one of the actions and the performing of a next one of the actions.

In some implementations, the method may further include identifying the one or more actions based on at least one of a process name of the server process or a process identifier of the server process.

In some implementations, triggering the one or more actions related to server process may include sending an indication identifying the server process to a server monitor process, the server monitor process causing the one or more actions to be performed responsive to the indication. It may, for example, be that causing the one or more actions to be performed responsive to the indication includes sending, by the server monitor process, a request to the operating system that further indications identifying the server process be suppressed.

In some implementations, it may be that the client process is safety-certified and the server process is not safety-certified.

According to the subject matter of the present application, there may be provided a computer-readable storage medium storing an operating system. The computer-readable storage medium may be a non-transitory computer-readable storage medium. The operating system may include instructions that, when executed by one or more processors of a computer system cause the computer system to: receive, by a kernel of the operating system from a client process managed by the operating system, a call to send a message to a server process, the call blocking a calling thread of the client process to await a reply to the message from the server process; deliver, by the kernel, the message to the server process; determine that a timeout has expired without the server process having replied to the message; upon determining that the timeout has expired without the server process having replied to the message, send, by the kernel to the server process, a request for the server process to reply to the message; after sending the request for the server process to reply to the message, determine that a further period of time has elapsed without the server process having replied to the message; and upon determining that the further period of time has elapsed without the server process having replied to the message, triggering, by the kernel, one or more actions related to the server process.

In some implementations, the one or more actions may include sending a signal to the server process. For example, the signal may be a signal to the server process to terminate.

In some implementations, the one or more actions may include rebooting the computer system.

In some implementations, the one or more actions may be performed in sequence. For example, it may be that the one or more actions are performed in sequence with a configurable delay between the performing of a given one of the actions and the performing of a next one of the actions.

In some implementations, it may be that the instructions, when executed by the processor, further cause the computer system to identify the one or more actions based on at least one of a process name of the server process and a process identifier of the server process.

In some implementations, it may be that the operating system includes a server monitor process, and it may be that triggering the one or more actions related to the server process includes sending, by the kernel to a process executing the server monitor, an indication identifying the server process, the server monitor process causing the one or more actions to be performed responsive to the indication.

According to the subject matter of the present application there may be provided a computer system. The computer system may include one or more processors and a memory communicably coupled to the one or more processors. The memory may store instructions that, when executed by at least one of the one or more processors, cause the computer system to: receive, by a kernel of an operating system of the computer system from a client process managed by the operating system, a call to send a message to a server process, the call blocking a calling thread of the client process to await a reply to the message from the server process; deliver, by the kernel, the message to the server process; determine that a timeout has expired without the server process having replied to the message; send, by the kernel to the server process, a request for the server process to reply to the message; determine that a further period of time has elapsed without the server process having replied to the message; and trigger, by the kernel, one or more actions related to the server process.

In some implementations, the one or more actions may include at least one of sending a signal to the server process to terminate and a rebooting of the computer system.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
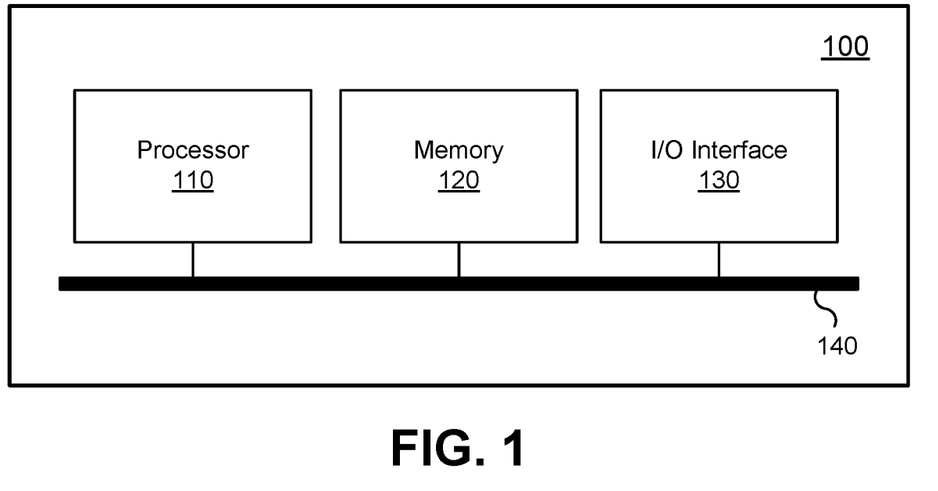
FIG. 1 shows a high-level block diagram of an example computing device.

FIG. 1 shows a high-level block diagram of an example computer system 100. The example computer system 100 may comprise a computing device. As illustrated, the example computer system 100 includes a processor 110, a memory 120, and an I/O interface 130. The foregoing modules of the example computer system 100 are in communication over a bus 140.

The processor 110 comprises a hardware processor and may, for example, comprise one or more physical processors and/or one ore more processor cores. The processor 110 may use an instruction set such as, for example, ARM, x86, MIPS, or PowerPC™ instruction sets. For example, the processor 110 may be or may include one or more Intel™ Core™ processors, Qualcomm™ Snapdragon™ processors, or the like.

The memory 120 comprises a physical memory. The memory 120 may include random access memory, read-only memory, persistent storage such as, for example, flash memory, a solid-state drive or the like. Read-only memory and persistent storage are a computer-readable medium and, more particularly, may each be considered a non-transitory computer-readable storage medium. A computer-readable medium may be organized using a file system such as may be administered by software governing overall operation of the example computer system 100.

The I/O interface 130 is an input/output interface. The I/O interface 130 allows the example computer system 100 to receive input and provide output. For example, the I/O interface 130 may allow the example computer system 100 to receive input from or provide output to a user. In another example, the I/O interface 130 may allow the example computer system 100 to communicate with a computer network. The I/O interface 130 may serve to interconnect the example computer system 100 with one or more I/O devices such as, for example, a keyboard, a display screen, a pointing device like a mouse or a trackball, a fingerprint reader, a communications module or the like.

Software comprising instructions is executed by the processor 110 from a computer-readable medium. For example, software may be loaded into random-access memory from persistent storage or flash memory of the memory 120. Additionally or alternatively, software may be executed by the processor 110 directly from read-only memory of the memory 120. In another example, software may be accessed via the I/O interface 130.

Figure 2:
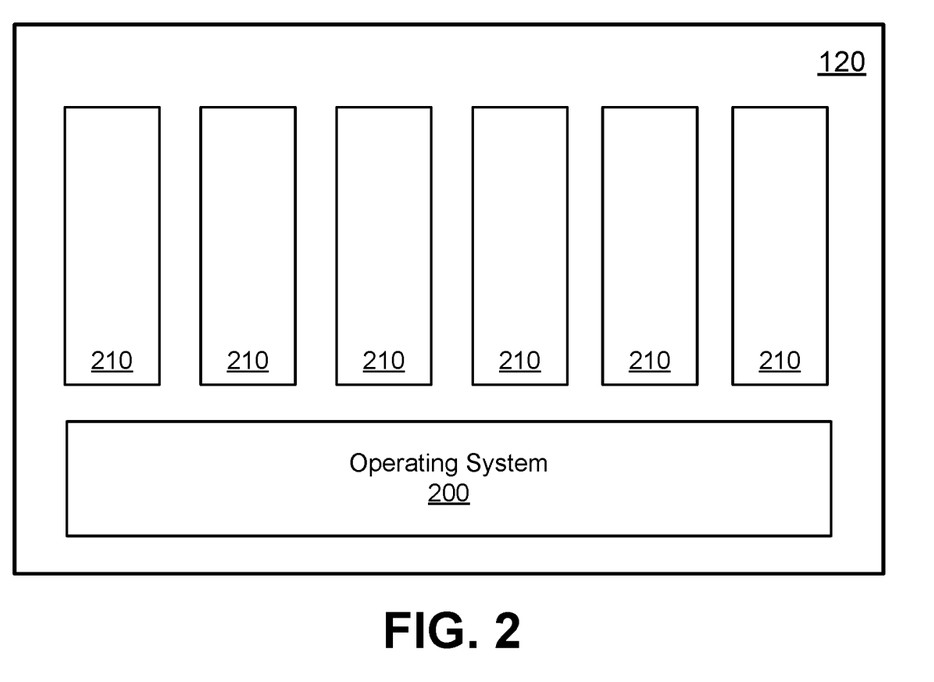
FIG. 2 shows a simplified organization of software components stored in a memory of the example computing device of FIG. 1.

FIG. 2 depicts a simplified organization of software components stored in the memory 120 of the example computer system 100. As illustrated these software components include an operating system 200 and processes 210.

The operating system 200 is software. The operating system 200 hosts the processes 210 and is responsible for scheduling their execution on the processor 110. The operating system 200 also allows the processes 210 to access the memory 120 and the I/O interface 130. In some cases, the operating system 200 may correspond to a microkernel of a microkernel operating system such as, for example, QNX™ Neutrino™ or MINIX 3. For example, it may be that various of the processes 210 are server processes such as may be responsible for providing various operating system services while others of the processes 210 are client processes which correspond, for example, to applications executing on the example computer system 100 that adapt the example computer system 100 for a particular purpose. Client processes may rely on services provided by server processes. In some cases, a process that is a server process relative to some client process may itself be a client process of another process.

An interprocess communication (IPC) mechanism can allow client processes to communicate with server processes and vice-versa. Interprocess communication is a function that may be provided by an operating system. For example, in the case of a microkernel OS, some or all aspects of IPC may be provided or enabled by the microkernel. An example of an IPC mechanism is message passing. With messaging passing, a bundle of data, called a message, can be sent from one process to another process. A corresponding reply message may then be sent in reply to that message.

Figure 3:
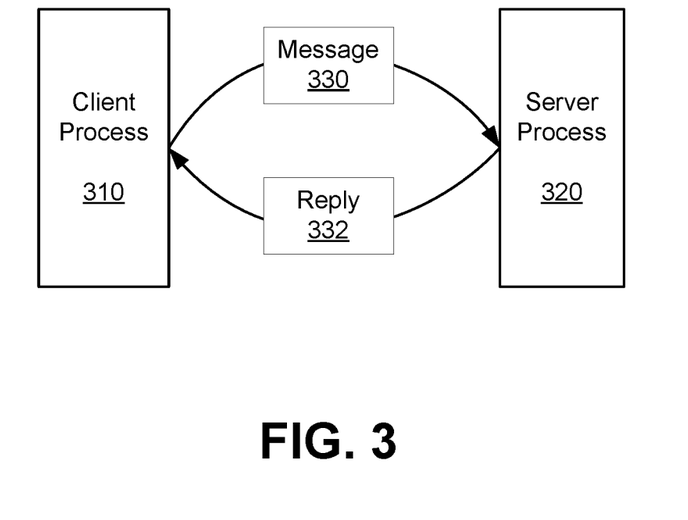
FIG. 3 provides a schematic illustration of an exchange of messages between a client process and a server process.

FIG. 3 provides schematic illustration of an exchange of messages between a client process 310 and a server process 320 according to an example of message-passing IPC. As illustrated, the client process 310 may first send a message 330 to the server process 320. The server process 320 may then receive the message 330 and may subsequently send a reply 332 to client process 310, the reply 332 corresponding to the message 330. For example, the server process 320 may send the reply 332 after taking some action corresponding to the payload of the message 330. In a particular example, the reply 332 may correspond to the result of a request represented by the message 330.

Message passing can be employed for various purposes. For example, in some microkernel operating systems, messaging passing may form the primary mechanism for communication between processes. In a particular example, QNX Neutrino relies on message passing for modularity and to provide decoupling between components of the operating system. Notably, in the C-language standard library implementation provided in QNX Neutrino, functions (e.g., open( ) write( ) are implemented using message passing.

Message passing can be conceived of as a protocol between a client process and a server process that are exchanging messages. Such a protocol may be described in terms of states assumed by the various actors (e.g., the client process and the server process) as a part of a message-exchange (e.g., by the client process 310 and the server process 320 in the exchange of the message 330 and the reply 332).

Figure 4:
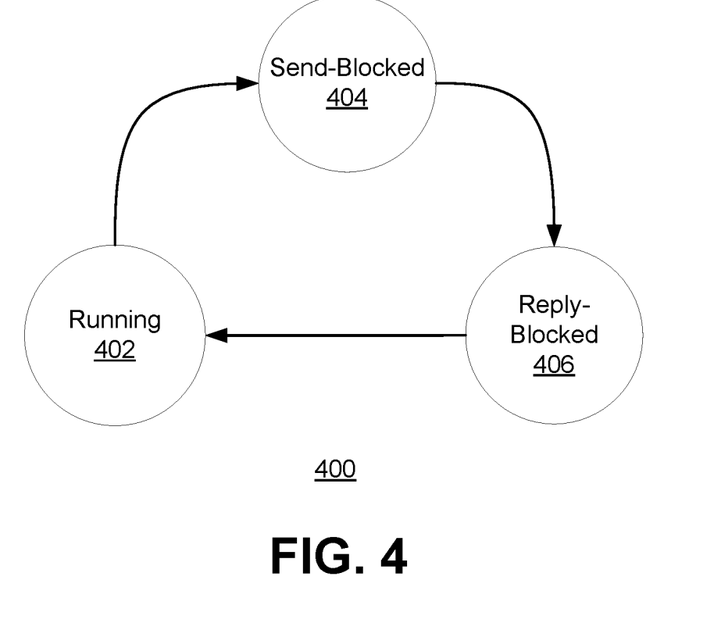
FIG. 4 shows a state diagram illustrating states of the client process of FIG. 3 during the exchange of messages depicted in FIG. 3.

FIG. 4 shows a state diagram 400 illustrating states that the client process 310 may assume during the exchange of messages depicted in FIG. 3. Notably, the state diagram 400 corresponds to states that a client process running on a computing device in which the OS is QNX Neutrino may assume according to the QNX Neutrino messaging-passing model.

The state diagram starts with a Running state 402. In the Running state 402, the client has not yet sent a message. Upon sending the message 330, the client process 310 moves from the Running state 402 to a Send-Blocked state 404. The Send-Blocked state 404 indicates that either the server process 320 has not yet received the message 330 or that the message 330 has been delivered to the server process 320 but the message 330 has not yet been dequeued by the server process 320 from its channel of incoming messages (i.e., the message has been delivered, but not yet accessed by the server process 320). Once the server process 320 receives the message 330 (including dequeuing it as needed), the client process 310 moves to a Reply-Blocked state 406. The Reply-Blocked state 406 indicates that the server process 320 has received the message 330 and is expected to be working on processing it.

The client process 310 will remain in the Reply-Blocked state 406 until the server process 320 sends the reply 332. Put another way, the client process 310 (or at least a calling thread thereof that sent the message 330) will be blocked awaiting a reply to the message 330. This could be, for example, because the client process 310 sends the message 330 using a function call that is expected to block until a reply to that message is received.

Notably, the message passing protocol can imply that client process 310 may wait on the server process 320 for an unknown and undefined amount of time before the server process 320 issues a reply, thereby unblocking the client process 310 (or, if only a sending thread of the client process 310 was blocked, that sending thread) and returning it to the Running state 402. Indeed, the protocol may be such that neither the Send-Blocked state 404 nor the Reply-Blocked state 406 guarantees that the server process 320 will issue the reply 332 to the client process 310 within any bounded amount of time. For example, the server process 320 could delay due to an error, due to unexpected processing time, and/or may simply leave the client process 310 hanging indefinitely such as, for example, due to an unhandled failure or a programming error. Some specific server processes may, provide such a guarantee, not as part of the message passing protocol but rather as a matter of contract, if they have been specially and carefully prepared. For example, certain server processes providing safety-critical functionality such as, for example, in an embedded system (e.g., in an automobile), may be safety-certified and may offer guarantees regarding response times.

The client process 310 may take some steps to attempt to abort a message passing exchange if the server process 320 does not timely handle the message 330. For example, a timeout mechanism may be provided by the operating system allowing the client process 310 to request a timeout if the message 330 is not timely handled.

In a particular example, in QNX Neutrino, the client process 310 may set such a timeout by calling TimerTimeout( ) prior to making a blocking call to send the message 330. TimerTimeout( ) allows an event such as, for example, SIGEV_UNBLOCK to be sent if a blocking call exceeds a timeout so set. The behavior upon receipt of such an event may be to allow an abort of the sending of the message 330 if possible. For example, if the client process 310 is still in the Send-Block state 404 when the timeout expires (indicating that the server process 320 has not yet seen the message 330), the operating system may unwind the message exchange by removing the message from the message channel of the server process 320 thereby unblocking the client process 310 (or, more particular, the sending thread thereof). If, however, the client process 310 is in the Reply-Blocked state 406 (indicating that the server process 320 has already received and potentially begun processing of the message 330), such an unwind may not be possible. For example, allowing such an unwind/abort of the message exchange after the message 330 has been delivered to the server process 320 could be considered to make the programming of a server process unduly complex due to the need to handle aborts. Indeed, such handling could be particularly difficult, for example, in the case of a single-threaded server. Additionally or alternatively, complexity could arise in correlating subsequent replies to further messages from the client process 310 to the server process 320. For example, it could be that the messaging protocol specifically disallows multiple in-flight message passing exchanges between a given client and server in order to reducing the complexity of correlating messages and replies and this could condition could be violated if such an abort were permitted. In a particular example, in QNX Neutrino, once a client process enters the Reply-Blocked state 406, the timeout is effectively treated as advisory. More particularly, if a timeout occurs in a messaging passing exchange where the client process is in the Reply-Blocked state 406, the operating system will send a "pulse" (a lightweight message that does not expect a reply and does not have an associated request-reply semantic) to the message channel of the server process, but the co-operation of the server process 320 to handle the pulse is required. In particular the server process 320 is expected to co-operate by issuing a swift reply to the relevant outstanding message (i.e., the message 330). Unless and until such a reply is provided, the client process 310 (or at least the sending thread thereof) will remain blocked awaiting a reply. Notably, where a server fails to provide such a reply/fails to provide such a reply in a timely fashion after receiving such a pulse, the client may remain blocked, potentially indefinitely.

As mentioned above, server processes may be safety-certified. Similarly, client processes may also be safety-certified. Further, a safety-certified process that is a server to one process (and thus may be viewed as a safety-certified server) may be a client of another process as mentioned above (and thus may be also viewed as a safety-certified client). In order to satisfy its safety-certification guarantees, a given process acting as a client process in a given message passing exchange may need to receive replies (or at least be able to guarantee to be unblocked) within some timeframe. However, it may be burdensome or impractical to require that all processes that may act as a server to a safety-certified client are also safety-certified. Accordingly, it would be desirable to allow client processes such as safety-certified clients to be provided with greater assurances of being unblocked when awaiting a reply from a server process if that server process does not provide such a reply in a timely fashion. Furthermore, it may be desirable to provide such assurances without adding complexity to the message-passing protocol. According to the subject matter of the present application, a mechanism is provided allowing actions to triggered by the operating system in response to a server process that does not unblock a client awaiting a reply when the server has been provided with an indication to do so. In this way, action may be taken allowing, for example, the client process awaiting a reply to be unblocked.

Figure 5:
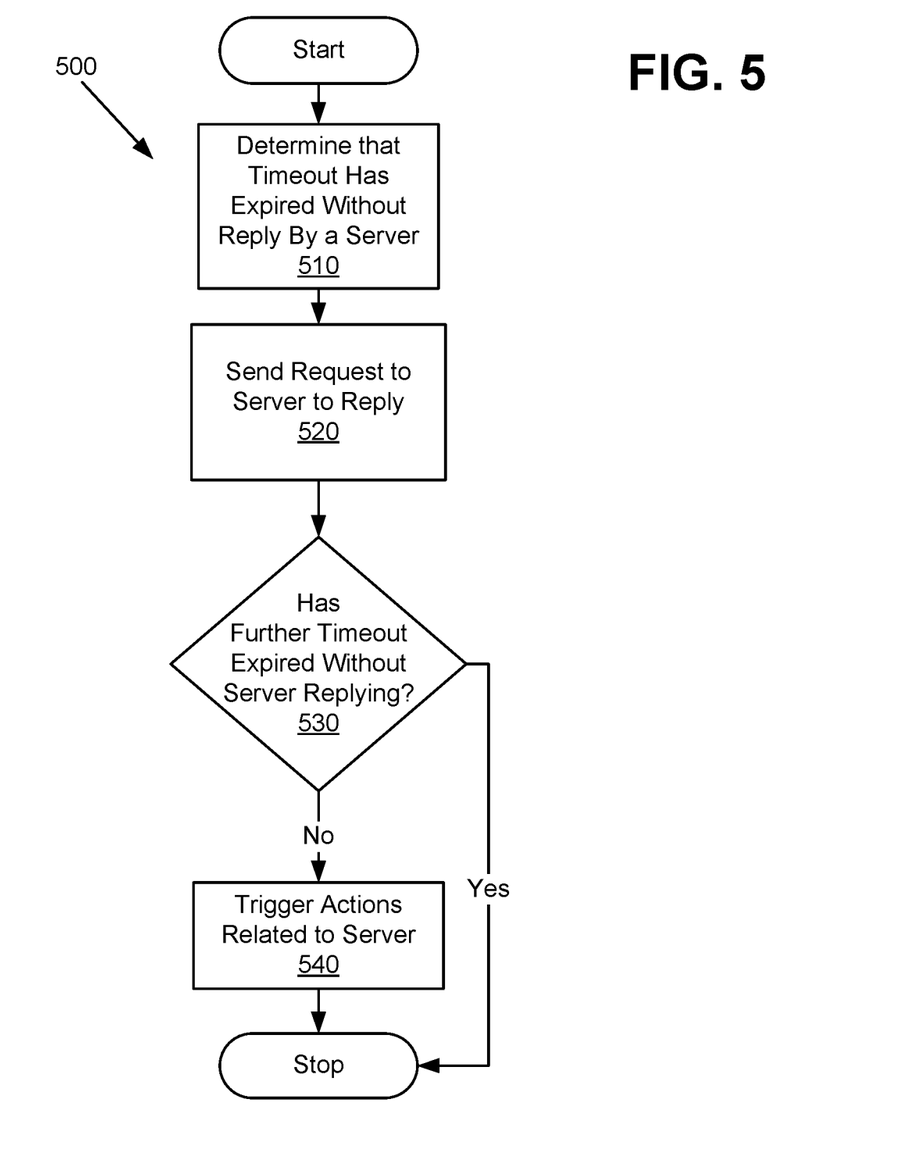
FIG. 5 provides a flow chart illustrating a method for unblocking a client process blocked awaiting a server process that does not timely reply to a message.

FIG. 5 provides a flow chart illustrating a method 500 including operations starting with an operation 510 and continuing onward as may be performed by the example computer system 100, and, more particularly, by the processor 110 executing instructions, the method including triggering actions responsive to the server process 320 not unblocking the client process 310 when it is awaiting a reply to the message 330.

For example, as discussed above, it may be that a sending thread of the client process 310 has sent the message 330 to the server process 320. As discussed above, the sending thread of the client process 310 may be blocked by the sending of the message so as to await the reply 332 from the server process 320. As also mentioned above, the client process 310 may set a timeout for receiving a reply to the message 330. As such, at the operation 510, subsequent to the sending of the message 330 by the sending thread of the client process 310 to the server process 320, the example computer system 100 may determine that a timeout has expired without the server process having replied to the message 330 (e.g., without sending the reply 332). For example, it may be that the operating system, (which may be responsible for managing the various processes executing on the example computer system 100 including the client process 310 and the server process 320) determines that such a timeout has expired.

Following the operation 510, an operation 520 is next. At the operation 520, a request may be sent to the server process 320 to request that it reply to the message 330 so as to unblock the client process 310 and, more particularly, the sending thread thereof (i.e., the thread that sent the message 330). Such a request may, for example, correspond to the above-discussed lightweight message ("pulse").

Notably, it may be that, before, after, or upon sending such a request, a further timeout is set for the server process 320 to honor the request that it reply to the message 330.

After sending the request for the server process 320 to unblock the sending thread by replying to the message 330 at the operation 520, an operation 530 is next.

The operation 530 is reached when the above-mentioned further timeout has expired. At the operation 530, the example computer system 100 determines whether further timeout has expired without the server process 320 replying to the message 330. Such a determination may be made, for example by the operating system of the example computer system 100. If so, then the method completes. Alternatively, if is determined that the further period has elapsed without the server process 320 having replied to the message 330, then an operation 540 is next.

At the operation 540, one or more actions related to the server process 320 are triggered. The actions may be intended to unblock the client process 310 or, more broadly, to place the example computer system 100 in a defined state. As further described below, the one or more actions may take a variety of forms.

In a first example, the one or more actions may include sending a signal to the server process 320. Such a signal, may for example, be or include a POSIX signal. The signal may be a signal to the server process 320 to terminate (e.g., exit). For example, in the case of POSIX signals, a POSIX signal such as, for example, SIGTERM and/or SIGKILL, could be sent to the server process 320 in an effort to cause it to terminate. Notably, where a server process from which a client process is awaiting a reply terminates before such a reply is sent, the client process may be expected to be unblocked. For example, the client process may receive an error indicating that the target of its message has terminated.

In a second example, the one or more actions may have a broader effect. For example, it could be that the one or more actions include restarting the operating system of the example computer system 100. Put another way, the one or more actions may include rebooting the example computer system 100.

The various actions may be performed in sequence. For example, it could be that a sequence of actions related to the server process 320 are performed in sequence with a delay between the performing of a given one of the actions and the performing of a next one of the actions. It may be that such a delay is configurable (i.e., the delay is a configurable delay).

In some cases, it may be that the client process 310 is safety-certified and the server process 320 is not safety-certified. Notably, the method of FIG. 5 may allow such a safety-certified client process to send messages to such a non-safety-certified server process while allowing the client process to be provided with assurances related to being unblocked if timely replies are not received from the non-safety-certified server process. Conveniently, in this way, the need to safety-certify server processes may be reduced or avoided.

Figure 6:
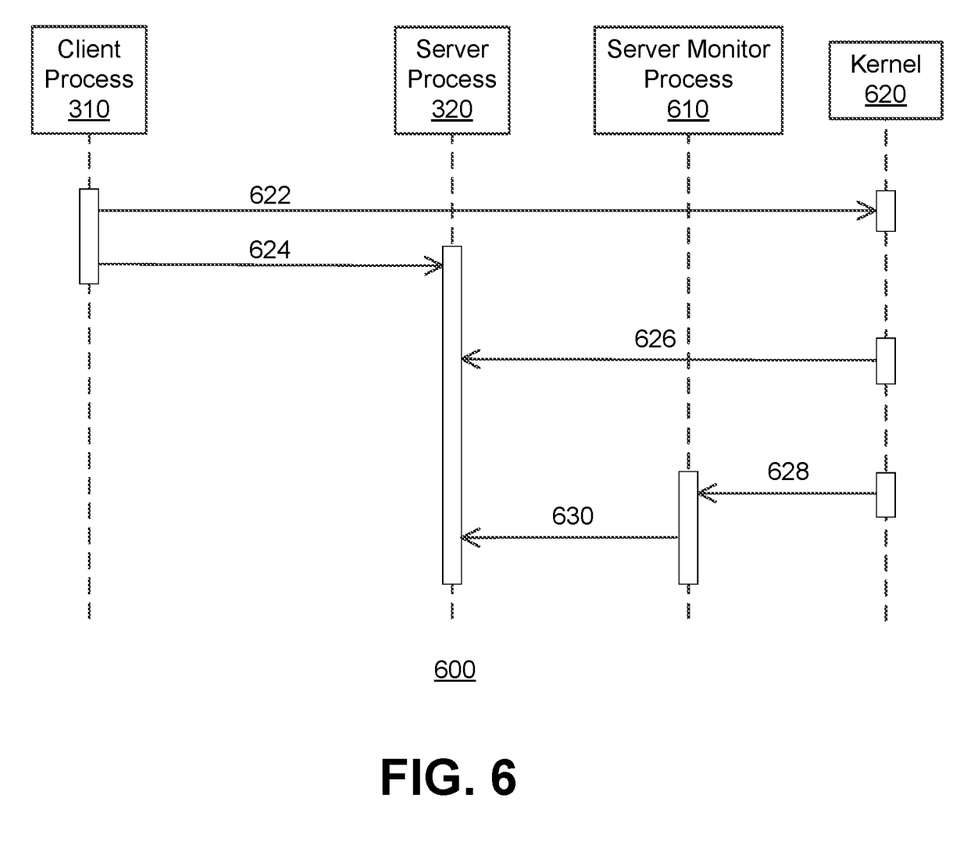
FIG. 6 is a sequence diagram depicting interactions between processes.

As mentioned above, various of the operations of the method 500 illustrated in FIG. 5 may be performed under control of the operating system of the example computer system 100. As discussed, in some cases, an operating system may be monolithic, while in other cases, an operating system may involve one or more processes operating atop an operating system such as, for example, a microkernel. An example of how the method 500 may be provided in such a microkernel operating system environment will now be discussed with reference to FIG. 6. FIG. 6 provides a sequence diagram 600 depicting interactions between processes including in performing the method of FIG. 5 in an example implementation.

Referring to FIG. 6, in addition to the client process 310 and the server process 320, actors involved in the sequence diagram 600 include a server monitor process 610 and a kernel 620.

As further described below, the server monitor process 610 is a process responsible for performing aspects of the method of FIG. 5 in the example implementation of the subject matter of the present application depicted in the sequence diagram 600. In some cases, the server monitor process 610 may be considered a component of the operating system of the example computer system 100.

The kernel 620 is an operating system kernel and may, for example, correspond to the operating system 200 such as, for example, where the operating system of the example computer system 100 is a microkernel operating system as discussed above. Put another way, the kernel 620 may be a microkernel. The kernel 620 may be responsible for hosting and scheduling processes such as, for example, the client process 310, the server process 320 and the server monitor process 610.

Various interactions between the client process 310, the server process 320, the server monitor process 610, and the kernel 620 will now be discussed. In some cases, a given interaction may correspond to an exchange of messages. Additionally or alternatively, a given interaction may correspond to one or more function calls. More particularly, a given interaction may correspond to one or more calls to the operating system calls and/or a library thereof. In any event, the following explanation of the sequence diagram will refer to such interactions collectively as the sending of indications between processes.

First, as illustrated, the client process 310 may send an indication 622 to the kernel 620. The indication 622 may correspond to a system call. The indication 622 may serve to set a timeout for a next operation of the client process 310. For example, the indication 622 could correspond to a call to TimerTimeout( ) as discussed above.

Following the sending of the indication 622, the client process 310 may send an indication 624 to the server process 320. The sending of the indication 624 may correspond to the sending of the message 330 as discussed above. Although depicted as an interaction between the client process 310 and the server process 320, the sending of the indication 624 may involve a system call by the client process 310 to the kernel 620 (e.g., to one or more message passing IPC functions thereof). In any event, the timeout set by the indication 622 may be a timeout for the client process 310 receiving a response to the indication 624 from the server process 320. For example, where the indication 624 corresponds to the message 330, a reply to that message may be expected within the defined timeout.

Following the sending of the indication 624, the kernel 620 may determine that the timeout established by the indication 622 has elapsed without a reply having been sent by the server process 320 to the indication 624. This may, for example, correspond to the operation 510 (FIG. 5). After determining that the timeout has expired without the server process 320 having replied to the indication 624, the kernel 620 may send the indication 626 to the server process 320. The indication 626 may be a request to the server process 320 to unblock the sending thread of the client process 310 by replying to the message. For example, the indication 626 may comprise a lightweight message that does not expect a reply (e.g., a pulse) as discussed above. Notably the sending of the indication 626 may correspond to the operation 520 (FIG. 5).

As discussed above, a further timeout period may be established for the server process 320 to respond to a request that it unblock the client process 310. Following the sending of the indication 626, it may be determined that such a further period has elapsed without the server process 320 having issued a reply as expected (and requested). As mentioned above, such a determination may be made by the operating system of the example computer system 100. In a particular example, such a determination may be made by the kernel 620. Upon making such a determination, the kernel 620 may send an indication 628 thereof to the server monitor process 610. For example, the indication 628 could be a message that does not expect a reply such as, for example, a pulse as discussed above. The indication 628 may serve to trigger one or more actions related to the server process 320. Put another way, the server monitor process 610 may cause the one or more actions to be performed responsive to the indication. The server monitor process 610 may then perform some or all of the one or more actions and/or may cause them to be performed. For example, the server monitor process 610 may send an indication 630 to the server process 320. The indication 630 may correspond, for example, to the sending of a signal (e.g., a POSIX signal) to the server process 320. Notably, the sending of the indication 630 may, in some implementations, involve the server monitor process 610 making one or more operating system calls. For example, the indication 630 could correspond to the server monitor process 610 making a system call (e.g., into the kernel 620) such as, for example, a call to cause a POSIX signal to be sent by the operating system to the server process 320.

The sequence diagram 600 illustrates an example implementation of the subject matter of the present application in a microkernel operating system environment. Other manners of implementing the subject matter of the present application are also completed. For example, in the case of a monolithic operating system, some or all of the functionality of the server monitor process 610 may be incorporated into the operating system kernel.

As discussed above, the one or more actions related to the server process 320 may correspond to a sequence of actions. An example mechanism for identifying such a sequence of actions for a given server process will now be discussed with reference to FIG. 7.

Figure 7:
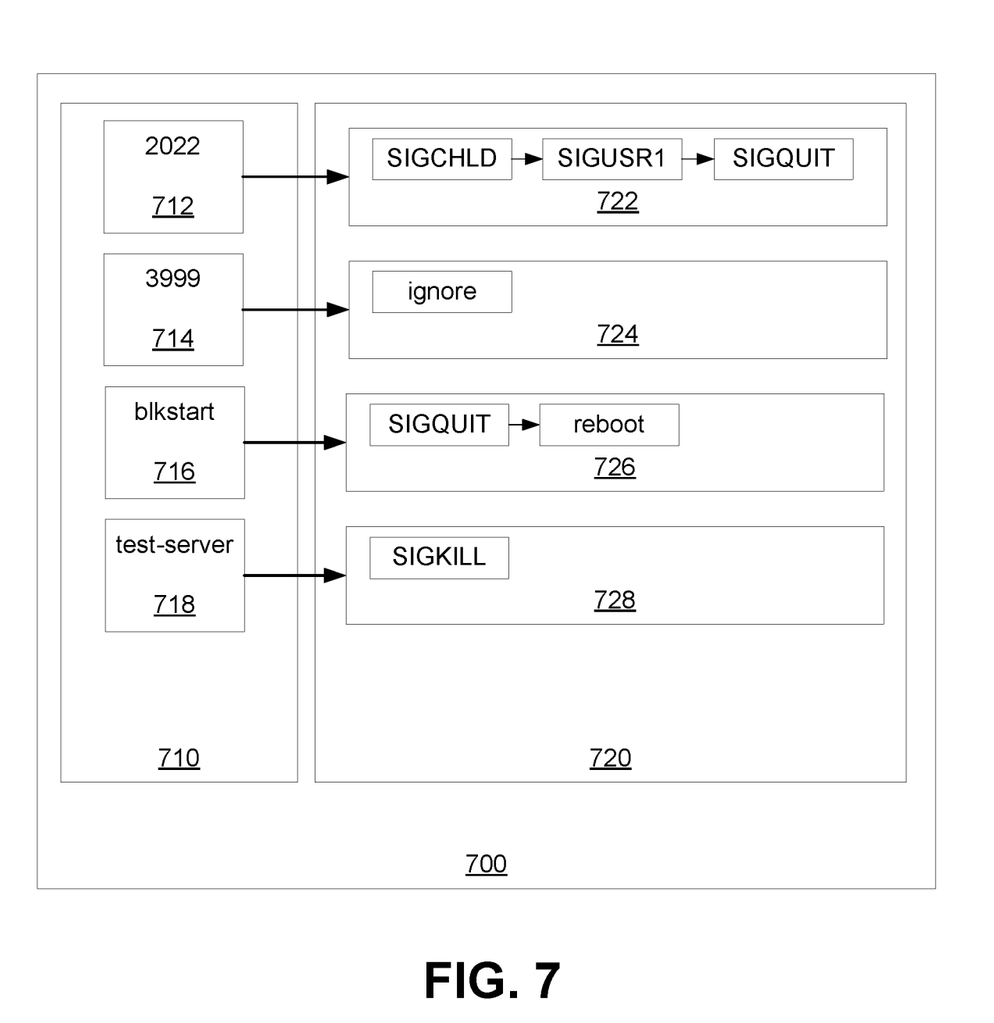
FIG. 7 is a schematic illustration of a look-up table storing actions to take with various server processes if they do not timely reply to messages.

FIG. 7 is a schematic illustration of a look-up table 700 storing actions to take with various server processes if they do not timely reply to messages. In some implementations, the look-up table 700 may correspond to a database such as may be stored and/or retrieved from persisted storage. Additionally or alternatively, the look-up table 700 may correspond to an in-memory data structure such as, for example, a dictionary. In a particular example, the look-up table 700 may be an in-memory data structure constructed based on one or more calls to an application programming interface (API) and/or based on one or more data files such as may, for example, be loaded from persisted storage.

The look-up table 700 includes an index 710 and a set of values 720. The index stores keys, each of which corresponds to a value of set of values 720. For example, as indicated by an arrow therebetween, a key 712 corresponds to a value 722, a key 714 corresponds to a value 724, a key 716 corresponds to a value 726, and a key 718 corresponds to a value 728.

Each of the keys in the index 710 is an index entry intended to match one or more servers. The respective corresponding one of values 720 for each of the keys of the index 710 stores a set of actions related to the servers intended to be matched by the corresponding key.

Some of the keys in the index 710 may be intended to match the process identifier (pid) of a particular process. For example, as illustrated, the key 712 may match a pid 2022 and the key 714 may match a pid 3999. Others of the keys in the index 710 may be intended to match process(es) having a particular name. For example, as illustrated, the key 716 may match processes named "blkstart", while the key 718 may match processes named "test-server".

As mentioned above, each of the keys in the index 710 has an associated entry in the set of values 720. Each of the entries in the set of values 720 stores a sequence of one or more actions. These actions are actions related to one or more processes as may be matched by the key in the index 710 corresponding to a given entry in the set of values 720. Once a given sequence of actions is triggered, each of the actions in the sequence may be performed one after another, in turn. In some implementations, there may be a delay between the performing of each of the actions. Such a delay may be customizable. Notably, it may be that, once triggered, a given action sequence will run to completion regardless of whether one of the earlier actions results in an unblocking of one or more client processes previously blocked on that server.

As illustrated, various of the actions correspond to signals and, in particular, to POSIX signals (e.g., SIGCHLD, SIGUSR1, SIGQUIT, SIGKILL). Other POSIX signals may, additionally or alternatively, be employed. The performing of an action corresponding to a signal may be or may include the sending of that signal to the process for which actions were triggered (i.e., the server process that has blocked its client by failing to reply to a message therefrom). Other example actions depicted in FIG. 7 include the "ignore" and "reboot".

Ignore may correspond to an instruction that unblock requests should be ignored for the server in relation to which actions have been triggered (e.g., no actions should actually be performed). For example, in implementations including a server monitor process like the server monitor process 610 (FIG. 6), the server monitor process may send an indication of an ignore action to the operating system kernel (e.g., the kernel 620 (FIG. 6)) to signal that it should not send any further indications to the server monitor process related to unblocking that process. Put differently, to perform an ignore action, the server monitor process may send a request to the operating system (e.g., to the kernel 620) that further indications identifying that server process be suppressed.

Reboot may correspond to an instruction to reboot or restart the example computer system 100 as discussed above. For example, in implementations including a server monitor process, the server monitor process may make a system call to reboot the example computer system 100.

A data structure like the look-up table 700 may be employed in identifying actions to trigger related to a particular process. For example, such a data structure may be employed by the operating system in order to identify the actions to trigger related to the server process 320 at the operation 540 (FIG. 5). In a particular example, the server monitor process 610 (FIG. 6) may employed and/or may maintain such a data structure.

It is possible that a given process may match one key based on its pid and another key based on its name. In such cases, a precedence rule may allow identification of the matching key (and thus the sequence of actions to be triggered) by defining a "winner" selected from amongst the multiple matching keys. For example, it may be that precedence is given to matches based on pid over matches based on process name.

Actions and action sequences in the nature of those discussed above in relation to the look-up table 700 may be employed in implementations of the subject matter of the present application whether or not a data structure like the look-up table 700.

Depending on the length of an action sequence and whether it has the effect of terminating the process in relation to which actions were triggered (e.g. the blocking server process), it is possible that the method of FIG. 5 may cause a sequence of actions to be triggered for a given blocking server process while an earlier-triggered sequence is still being performed. This may be handled in a variety of manners. For example, in some implementations, such a duplicate triggering/request may simply be ignored. Put differently, the operating system (e.g., the server monitor process if employed) may ignore duplicate requests for the same server process when it is in the middle of taking actions on that server process.

It will be appreciated that, while the above discussion was framed in terms of a single client process and a single server process, the subject matter of the present application is applicable to scenarios involving multiple in-flight messages from between more than one client process and/or server process. Indeed, it may be that the method of FIG. 5 is being performed in relation to more than one message exchange at substantially the same time (i.e., substantially/effectively in parallel). For example, it could be that actions are triggered in relation to more than one server process (each of the server processes blocking a respective client process by failing to respond to a corresponding message therefrom) resulting in action sequences being executed in relation to more than one server process at substantially the same time (i.e., substantially/effectively in parallel).

It will be appreciated that it may be that some or all of the above-described operations of the various above-described example methods may be performed in orders other than those illustrated and/or may be performed concurrently without varying the overall operation of those methods.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method comprising:
sending a message by a sending thread of a client process to a server process, wherein the sending thread of the client process is blocked by the sending to await a reply to the message from the server process;
determining by an operating system managing the client process and the server process that a timeout has expired without the server process having replied to the message;
upon determining that the timeout has expired without the server process having replied to the message, sending a request to the server process to unblock the sending thread of the client process by replying to the message;
after sending the request for the server process to unblock the sending thread by replying to the message, determining, by the operating system, that a further period has elapsed without the server process having replied to the message; and
upon determining that the further period has elapsed without the server process having unblocked the sending thread by replying to the message, triggering one or more actions related to the server process.

2. The computer-implemented method of claim 1, wherein the one or more actions include sending a signal to the server process.

3. The computer-implemented method of claim 2, wherein the signal comprises a signal to the server process to terminate.

4. The computer-implemented method of claim 1, wherein the one or more actions include restarting the operating system.

5. The computer-implemented method of claim 1, wherein the one or more actions are performed in sequence.

6. The computer-implemented method of claim 5, wherein the one or more actions are performed in sequence with a configurable delay between the performing of a given one of the actions and the performing of a next one of the actions.

7. The computer-implemented method of claim 1, further comprising identifying the one or more actions based on at least one of a process name of the server process or a process identifier of the server process.

8. The computer-implemented method of claim 1, wherein triggering the one or more actions related to the server process includes sending an indication identifying the server process to a server monitor process, the server monitor process causing the one or more actions to be performed responsive to the indication.

9. The computer-implemented method of claim 8, wherein causing the one or more actions to be performed responsive to the indication includes:
sending, by the server monitor process, a request to the operating system that further indications identifying the server process be suppressed.

10. The computer-implemented method of claim 1 wherein the client process is safety-certified and wherein the server process is not safety-certified.

11. A non-transitory computer-readable storage medium storing an operating system comprising instructions that, when executed by one or more processors of a computer system cause the computer system to:
receive, by a kernel of the operating system from a client process managed by the operating system, a call to send a message to a server process, the call blocking a calling thread of the client process to await a reply to the message from the server process;
deliver, by the kernel, the message to the server process;
determine that a timeout has expired without the server process having replied to the message;
upon determining that the timeout has expired without the server process having replied to the message, send, by the kernel to the server process, a request for the server process to reply to the message;
after sending the request for the server process to reply to the message, determine that a further period of time has elapsed without the server process having replied to the message; and
upon determining that the further period of time has elapsed without the server process having replied to the message, triggering, by the kernel, one or more actions related to the server process.

12. The computer-readable storage medium of claim 11, wherein the one or more actions include sending a signal to the server process.

13. The computer-readable storage medium of claim 12, wherein the signal is a signal to the server process to terminate.

14. The computer-readable storage medium of claim 11, wherein the one or more actions include rebooting the computer system.

15. The computer-readable storage medium of claim 11, wherein the one or more actions are performed in sequence.

16. The computer-readable storage medium of claim 15, wherein the one or more actions are performed in sequence with a configurable delay between the performing of a given one of the actions and the performing of a next one of the actions.

17. The computer-readable storage medium of claim 11, wherein the instructions, when executed by the one or more processors, further cause the computer system to:
identify the one or more actions based on at least one of a process name of the server process and a process identifier of the server process.

18. The computer-readable storage medium of claim 11, wherein the operating system includes a server monitor process, and wherein triggering the one or more actions related to the server process includes sending, by the kernel to the server monitor process, an indication identifying the server process, the server monitor process causing the one or more actions to be performed responsive to the indication.

19. A computer system comprising:
one or more processors; and
a memory communicably coupled to the one or more processors, the memory storing instructions that, when executed by at least one of the one or more processors, cause the computer system to:
receive, by a kernel of an operating system of the computer system from a client process managed by the operating system, a call to send a message to a server process, the call blocking a calling thread of the client process to await a reply to the message from the server process;
deliver, by the kernel, the message to the server process;
determine that a timeout has expired without the server process having replied to the message;
send, by the kernel to the server process, a request for the server process to reply to the message;
determine that a further period of time has elapsed without the server process having replied to the message; and
trigger, by the kernel, one or more actions related to the server process.

20. The computer system of claim 19, wherein the one or more actions include sending a signal to the server process.

21. The computer system of claim 20, wherein the signal is a signal to the server process to terminate.

22. The computer system of claim 19, wherein the one or more actions include rebooting the computer system.

23. The computer system of claim 19, wherein the one or more actions are performed in sequence.

24. The computer system of claim 23, wherein the one or more actions are performed in sequence with a configurable delay between the performing of a given one of the actions and the performing of a next one of the actions.

25. The computer system of claim 19, wherein the instructions, when executed by the at least one of the one or more processors, further cause the computer system to:
   identify the one or more actions based on at least one of a process name of the server process and a process identifier of the server process.

26. The computer system of claim 19, wherein the operating system includes a server monitor process, and wherein triggering the one or more actions related to the server process includes sending, by the kernel to the server monitor process, an indication identifying the server process, the server monitor process causing the one or more actions to be performed responsive to the indication.

* * * * *